(12) United States Patent
Pederson

(10) Patent No.: US 6,495,774 B1
(45) Date of Patent: Dec. 17, 2002

(54) LOAD CELL HOLDING MEANS

(76) Inventor: Brian L. Pederson, P.O. Box 30347, Bellingham, WA (US) 98228-2437

( * ) Notice: Subject to any disclaimer, the term of this patent is extended or adjusted under 35 U.S.C. 154(b) by 0 days.

(21) Appl. No.: 09/560,760

(22) Filed: Apr. 28, 2000

Related U.S. Application Data

(60) Provisional application No. 60/131,862, filed on Apr. 29, 1999.

(51) Int. Cl.[7] ................................................ G01G 19/08
(52) U.S. Cl. .................................. 177/136; 177/DIG. 9
(58) Field of Search ................................ 177/136, 137, 177/138, 139, DIG. 9

(56) References Cited

U.S. PATENT DOCUMENTS

| | | | |
|---|---|---|---|
| 3,661,220 A | 5/1972 | Harris | 177/136 |
| 3,854,450 A | 12/1974 | Holmstrom, Jr. | 177/136 |
| 3,927,724 A | 12/1975 | Baker | 177/136 |
| 4,020,911 A | 5/1977 | English et al. | 177/136 |
| 4,095,659 A | 6/1978 | Blench et al. | 177/136 |
| 4,666,003 A | 5/1987 | Reichow | 177/136 |
| 4,921,059 A * | 5/1990 | Woodle, IV et al. | 177/136 |
| RE35,301 E | 7/1996 | Reichow | 177/136 |

* cited by examiner

Primary Examiner—Randy W. Gibson
(74) Attorney, Agent, or Firm—Robert B. Hughes; Hughes Law Firm, PLLC

(57) ABSTRACT

A load cell member that removes the need for welding in a load cell installation process where the load cell is installed onto the frame of a truck. Where the load cell holding member is adapted to be bolted to a load cell and a lateral portion of the holding member is adapted to be bolted to a connecting member which is in turn bolted to the frame of a truck.

5 Claims, 8 Drawing Sheets

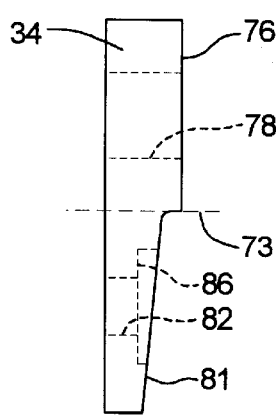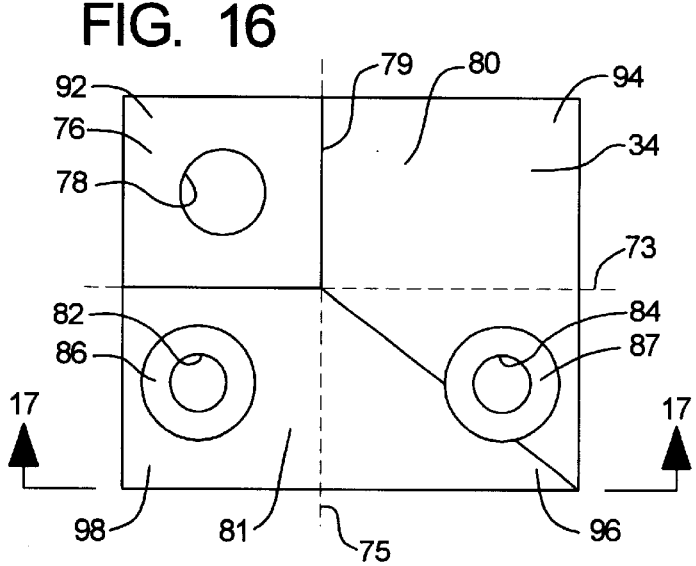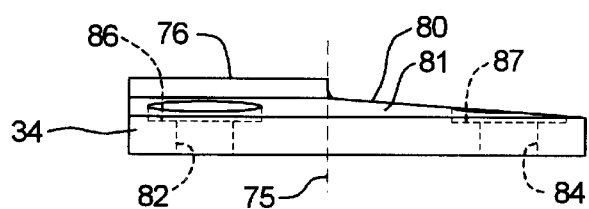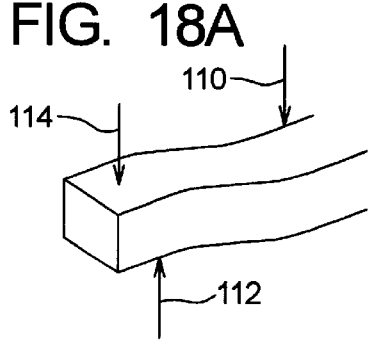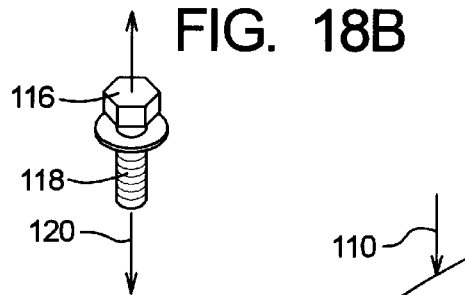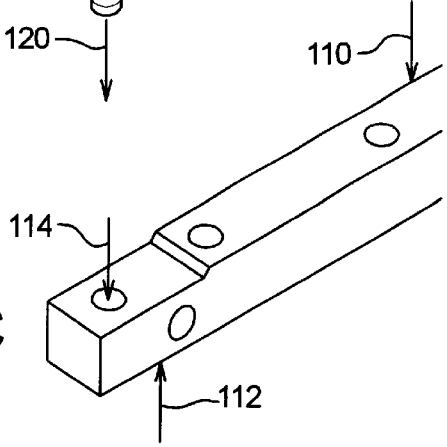

LOAD CELL HOLDING MEANS

This application claims the benefit of U.S. Provisional application No. 60/131,862, filed Apr. 29, 1999.

FIELD OF THE INVENTION

This invention relates to a load cell assembly and more particularly to a mounting and holding system for the load cell, a load cell holding member and also a method of installing the same. The invention is particularly adapted for use in semi trucks and trailers.

BACKGROUND OF THE INVENTION

Load cells are commonly used on semi-trucks and trailers to determine the weight of the load being carried. Load cells commonly function by utilizing an internal strain gage that measures deflection or sheer. Because the modulus of elasticity of a load cell is constant the amount of strain can be calibrated to determine the force upon the cell. The load cell is supported at its two end locations with force from the structure to which it is mounted acting upwardly on the load cell at each end location. The force exerted by the load to be measured is directed downwardly at the center portion of the load cell. This force stresses the load cell in a manner that the strain gages provide an output corresponding to the weight of the load being measured. For the load cells to function properly they must be rigidly mounted to a base structure, such as the frame of the semi truck or trailer.

A semi-truck generally has a frame that basically comprises two C-channel beams where the channel flanges are facing towards each other, separated by a lateral distance of approximately 34 inches, and they extend from the rear to the front of the truck or trailer. The C-channel beams each have an upper and a lower substantially level flanges and an outer substantially vertical web. The outer webs are on the outer exposed portion of the frame. The load cells extend longitudinally and there are at least two load cells per truck and trailer, each rigidly attached to its related C-channel member. A load bearing member spans the lateral distance between the each pair of cells and is connected to the center portion of each load cell.

The connection of the load cell holding means to the upper flange of the C-channel portion of the frame must be a rigid connection. Traditionally the load cells are attached by first bolting a lower leg of a structural angle to the vertical web of a C-channel member. The structural angle is mounted longitudinally with the C-channel and has a length which is longer than the load cell. The structural angle is bolted at several locations to the central area of the vertical web of the C-channel. In one prior art arrangement, the structural angle is configured so that upper horizontal leg of the structural angle is positioned directly on top of the upper flange of the C-channel and the lower leg of the structural angle is bolted at several locations to the more central area of the vertical web of the C-channel.

Traditionally there are provided load cell holding members that are welded on top of the upper leg of the structural angle. The process generally consists of retrieving an expendable load cell as an assembly fixture and bolting it down to the load cell holding members. Then the load cell holding members are welded down to the upper portion of the structural angle. This procedure is a time consuming and there are various problems such as the welds being subject to failure by fatigue, warpage and other problems.

DESCRIPTION OF THE DRAWINGS

FIG. 15 is a front view of one side of the load cell assembly of FIGS. 12 and 13;

FIG. 16 is a top view of a load cell holding member of FIG. 15; and

FIG. 17 side view of a load cell holding member of FIG. 15 and 16, taken from a location indicated at line 17 of FIG. 16;

FIG. 18A–18J shows multiple force diagrams of the forces acting upon a load cell, a load cell holding member, the angle and the truck frame.

DETAILED DESCRIPTION OF THE PREFERRED EMBODIMENTS

Figure 1:
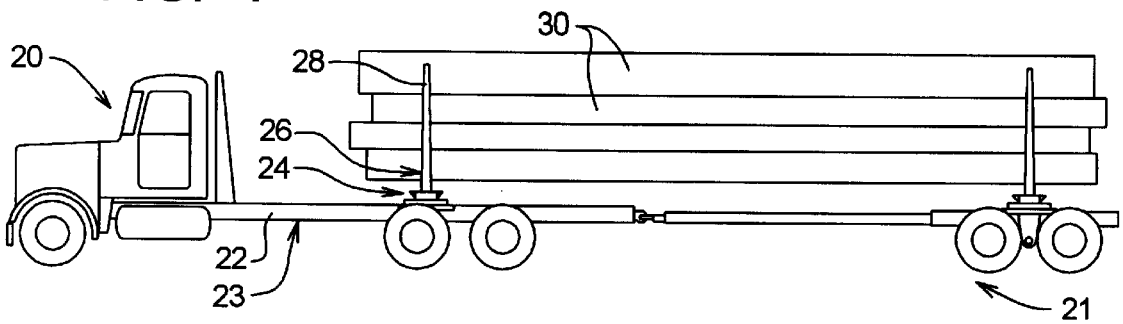
FIG. 1 is a side view of a logging truck and trailer in which the present invention can be utilized.

For purposes of clarity and organization in the following text there is first presented an overview of the environment in which the present invention is to be used, as shown in FIG. 1, and a brief introduction to the invention with reference to FIGS. 2–3. Next, there is an examination of the prior art making reference to FIGS. 4–10. Finally there is detailed description of the present invention referring to FIGS. 11–17 and again to FIGS. 2–3.

Overview of the Invention

The present invention can advantageously be used in the trucking industry and one application is with logging trucks and trailers as shown in FIG. 1. FIG. 1 shows a log truck 20 with a trailer 21. The truck has a frame 23 which is comprised of two C-channel members 22. Mounted to the frame 23 is a load cell assembly 24. Attached to each load cell assembly 24 is a transversely extending bunk 26 and a pair of vertical stakes 28 which extend vertically upward from opposite sides of the bunk 26 and work in combination to hold the logs 30.

Figure 2:
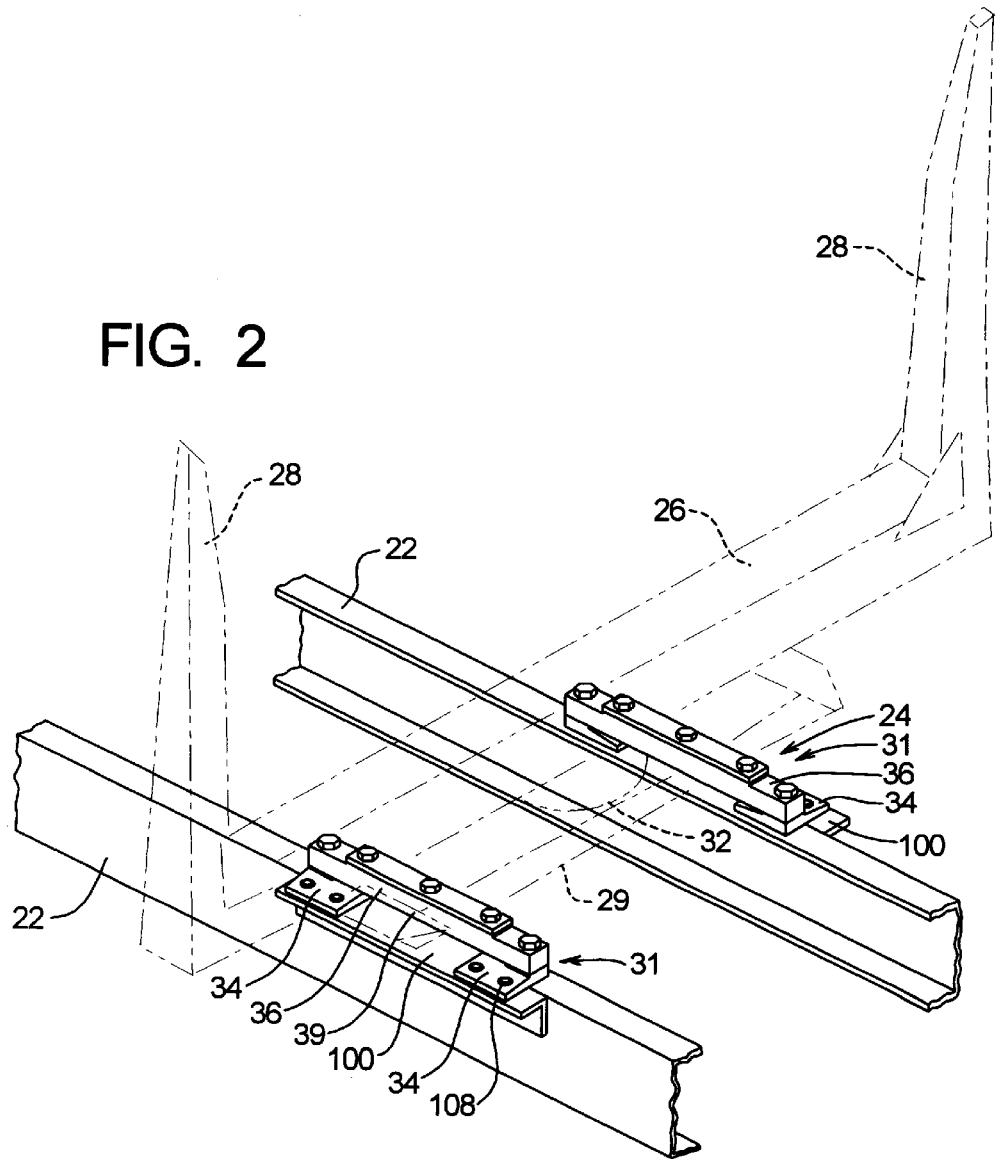
FIG. 2 is an isometric view of a truck frame to which two load cells are mounted with a bolster, and bunk support $5^{th}$ wheel mounted bunk with vertical stakes.

As seen in FIG. 2, bunk 26 is pivotally attached to bunk support $5^{th}$ wheel 32 that is attached to the bolster 29. Each of the two longitudinally extending C-channels 22 carries a load cell sub assembly 31 of the present invention which will be described in more detail later herein. Each sub assembly 31 comprises a structural angle 100, load cell holding members 34, the load cell 36 and several bolts 108 or other securing means. Each sub assembly 31 and the bolster 29 or other lateral connecting member comprise the aforementioned load cell assembly 24. In other words the load cell assembly 24 comprises structural angles 100, load cell holding members 34, load cells 36, bolts 108 and 52 or other securing devices, and a lateral load bearing member such as the bolster 29 or fifth wheel 38.

Figure 3:
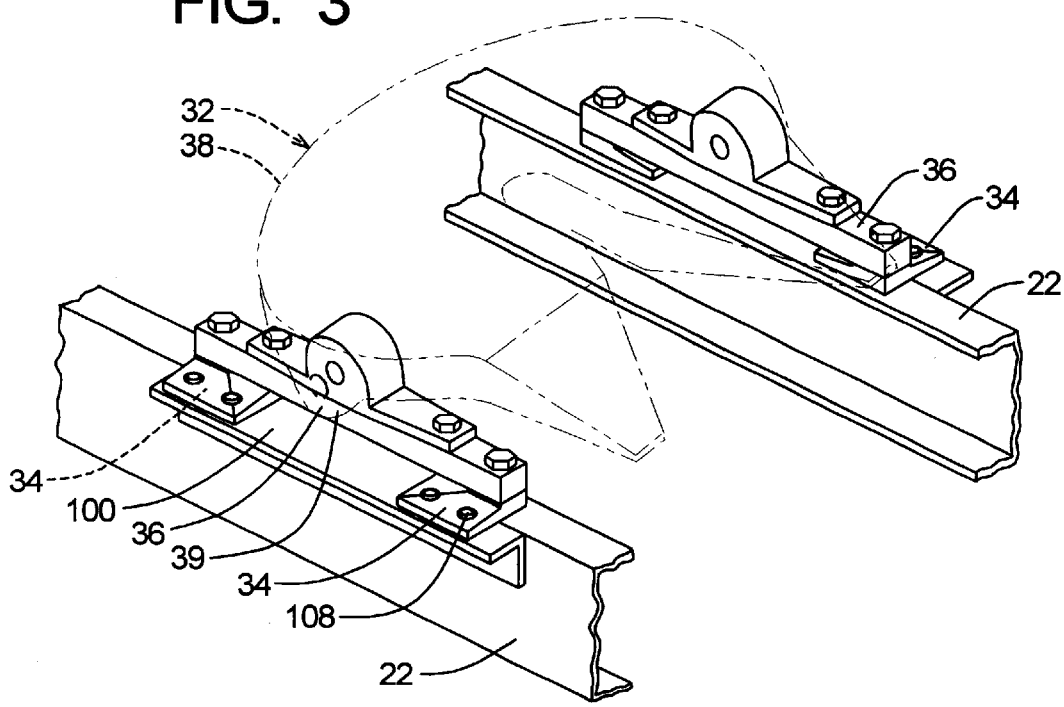
FIG. 3 is an isometric view of a frame of a semi-truck with two load cells mounted thereto and a fifth wheel mounted to the load cells.

FIG. 3 shows the present invention where the load cell assembly 24 is substantially the same as in FIG. 2 but instead of a bolster 29 attached to the central portion 39 of load cell 36 is a fifth wheel 38.

Detailed Description of the Prior Art

Before describing the present invention further, the prior art will now be described because now the reader should have general familiarity with the environment of the apparatus of the present invention. The prior art will be described with reference to FIGS. 4–10.

Figure 4:
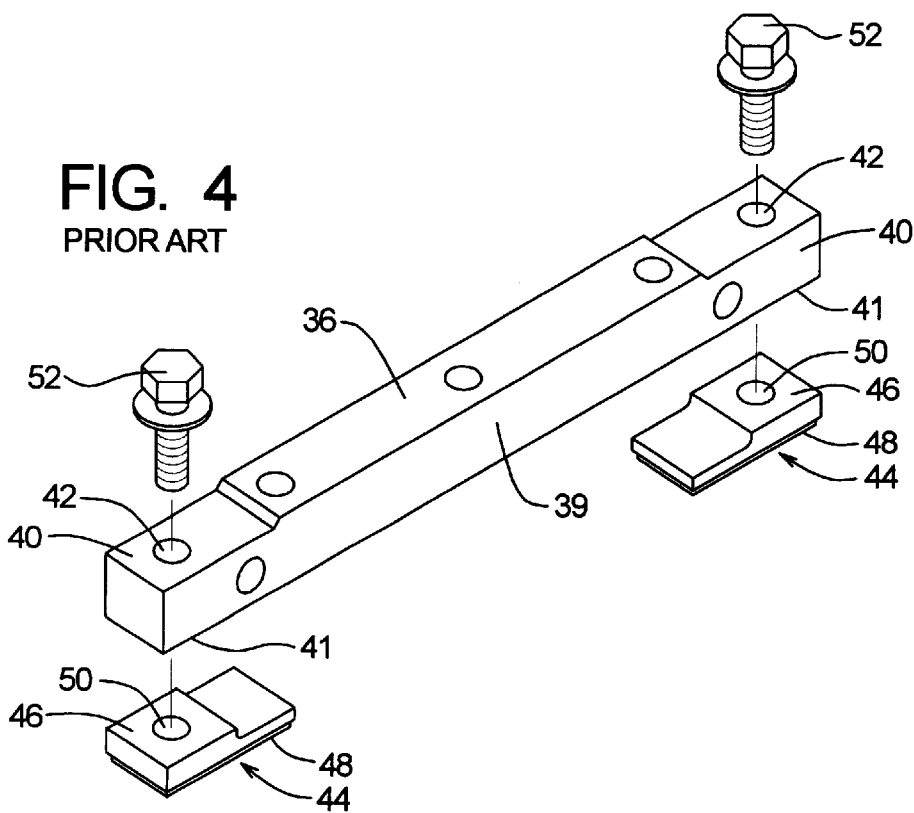
FIG. 4 is an exploded view of a load cell with the prior art arrangement of holding members and connecting bolts.

In FIG. 4 there is shown the load cell 36 having two end portions 40 in each of which is a vertical hole 42. There are two load cell holding members 44 each of which comprise an upper contact surface 46, a lower perimeter portion 48, and a tapped opening 50 which is threaded in a manner so it can receive bolt 52.

Figure 5:
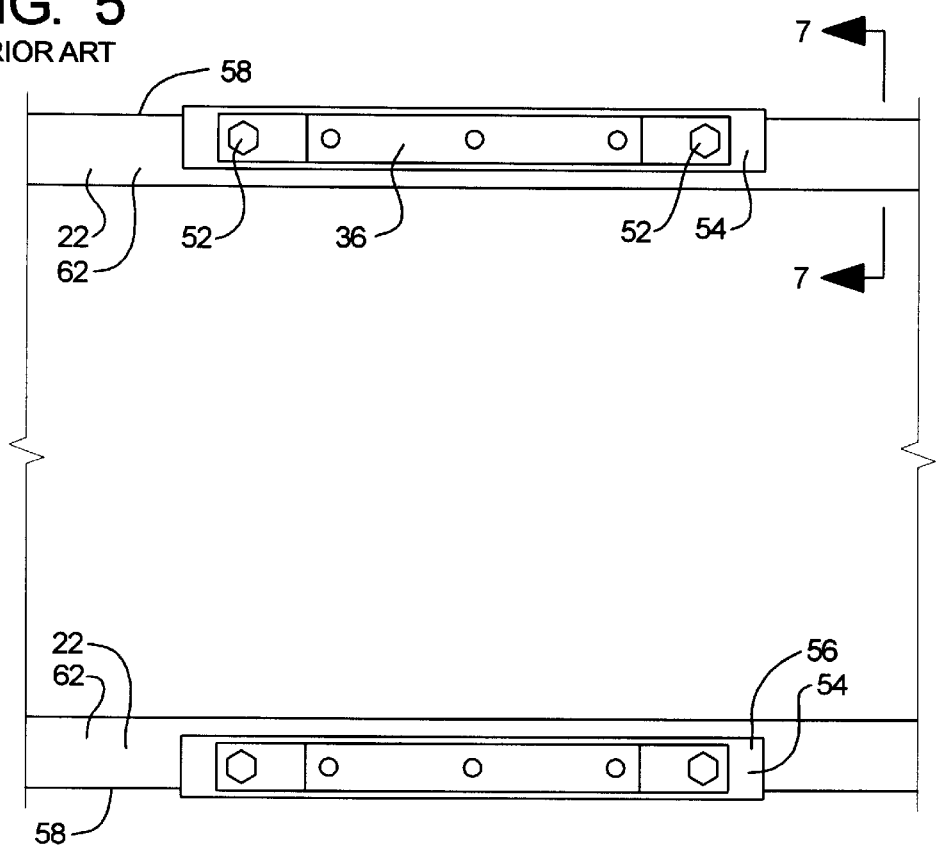
FIG. 5 is a top plan view of a prior art arrangement where the components of FIG. 4 are installed on two C-channel beams of a truck frame.
Figure 6:
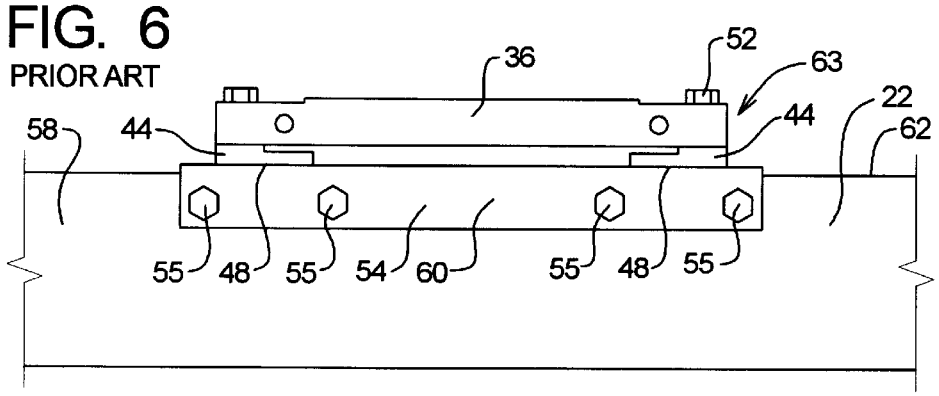
FIG. 6 is side view of a prior art load cell holding system of FIG. 5 at line 7.
Figure 7:
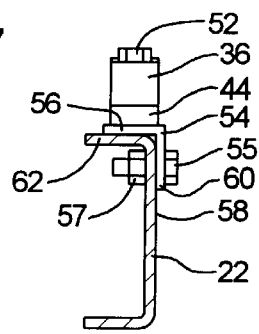
FIG. 7 is a front view of one of the two installed load cell units of FIG. 6.

In one prior art arrangement shown in FIGS. 5–7, each C-channel has a structural angle 54 attached thereto. The load cell 36 is bolted to the tapped opening 50 of the load cell holding member 44. The lower perimeter 48 of the load cell holding member 44 is welded to the upper horizontal leg 56 of the structural angle 54. The lower vertical leg 60 of the structural angle 54 is bolted to the vertical web 58 of the C-channel frame 23 by bolts 55 and nuts 57. There are openings in the vertical web 58 to allow passage of the bolts 55 to engage in nuts 57. The upper leg 56 of structural angle 54 is positioned on top of the upper flange 62 of C-channel 23 and indirect contact therewith so that the force of the load placed upon load cell 36 will be distributed the load cell holding members 44, and they will in-turn distribute the force to upper leg 65 of the structural angle which transfers the force to the upper flange 62 of C-channel members 22. The entire load cell sub-assembly 63 which comprise the load cell 36, the holding members 44, bolts 52, the structural angle 54 and the nuts and bolts 55/57 is attached to the C-channel members 22 by the bolts 55 and corresponding nuts 57.

The prior art method of assembling a load cell sub-assembly is as follows. First a structural angle 54 has four holes drilled in its lower vertical leg 60 and four corresponding holes are drilled the vertical web 58 of C-channel members 22 to provide access for the bolts 55. Bolts 55 are then bolted to the vertical web 58 by bolts 55 and nuts 57. Next, as best see in FIG. 4, an expendable load cell is bolted to the cell holding members 44 by inserting the bolts through vertical holes 42 and into the tapped openings 50. Since the tapped openings 50 of the cell holding members 44 are threaded there is no need for a receiving nut. After both load cell holding members 44 are bolted to an expendable load cell this assembly is placed on the upper leg 56 of structural angle 54 and the lower perimeter edge 48 of the load cell holding members 44 is welded to the upper leg 56. Then the expendable load cell is removed and replaced with a permanent load cell 36. Alternatively if an expendable load cell is not available, a functioning load cell is bolted to the load cell holding members 44 and they are tacked to the metal to be welded to. Then the load cells are removed and the load cell holding members 44 are welded to the upper leg 56.

There are numerous problems with this prior art assembly process. One problem is the insertion and removal of an expendable load cell. The expendable load cell is bolted to the load cell holding members 44 so the load cell holding members 44 are positioned correctly when they are welded. The heat generated from the welding process could damage a functioning load cell.

After the welding process the metal cools which could result in deflections that could cause misalignment of the contact portions 46. If both contact portions 46 of the load cell holding members 44 are not in the same plane the load cell will experience torsional deflections that adversely affect a load cell's accuracy and useful life span. Further, welds tend to fatigue and crack. Repair of a weld requires removing the load cell, rewelding the load cell holding member 44 to the upper leg 56 then reinserting the load cell 36. This is an expensive repair process.

Figure 8:
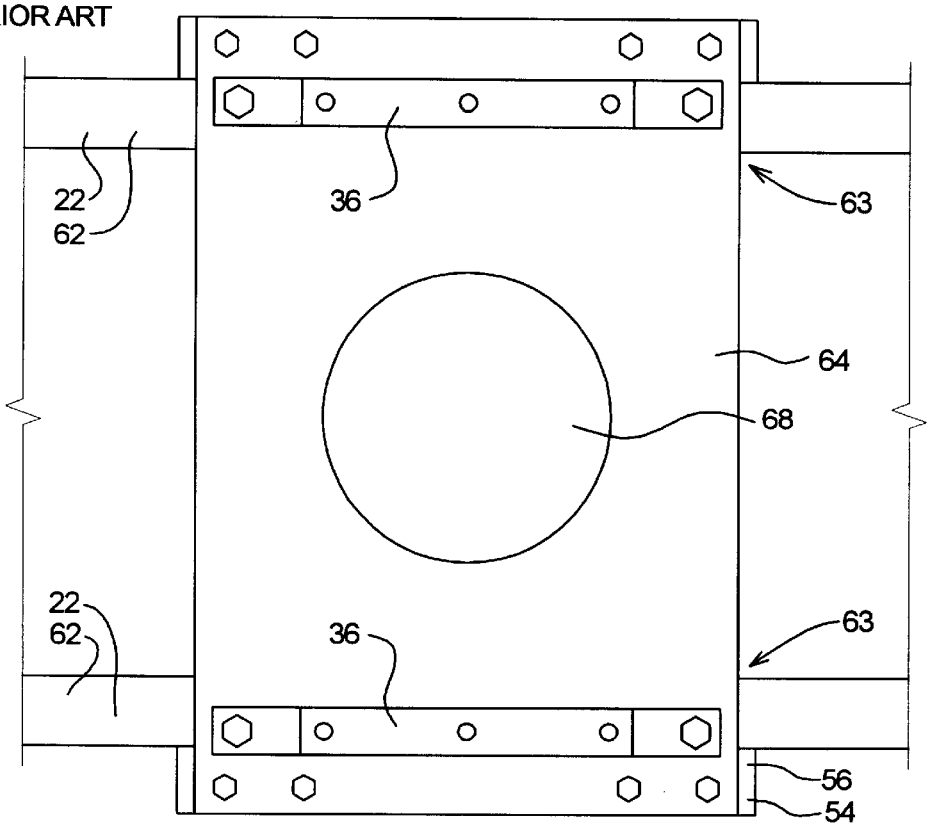
FIG. 8 is a top plan view of a second prior art load cell assembly.
Figure 9:
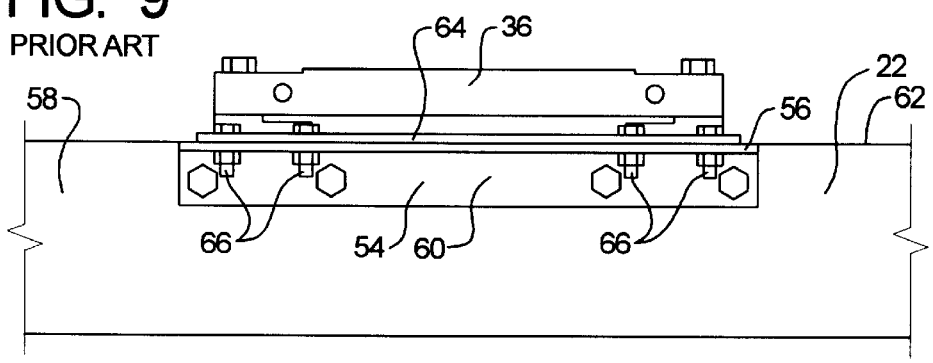
FIG. 9 is side view of the second prior art assembly of FIG. 8.
Figure 10:
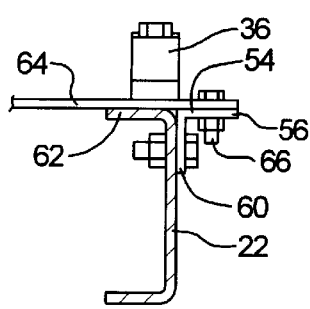
FIG. 10 is a front view of the load cell assembly of FIGS. 8 and 9.

A second prior art system is shown in FIGS. 8–10, and this is similar to first prior art system with a few modifications. The structural angle 54 is bolted to C-channel members 22 in a manner similar to that described above except upper leg 60 of the structural angle 54 is positioned to extend laterally outwardly from the C-channel members 22. The lower leg 60 of the structural angle 54 is bolted to the vertical web 58 so that the top portion of the upper leg is substantially level with the upper flange 62 of C-channel members 22.

On top of both the upper leg 56 and the upper flange 62 of both of the subassemblies 63 is a plate 64. This plate 64 extends from above one subassembly 63 to the other and it has a circular area 68 removed from its center portion to reduce weight. This plate 64 is bolted to the upper leg 56 of both subassemblies 63 by bolts 66. The load cell holding members 44 are welded to the plate 64 and the load cell is bolted to the load cell holding members 44 in the same manner as described in the previous prior art embodiment (see FIGS. 4–7).

The problems with this prior art system are similar to those of the prior art system of FIGS. 4–7. Welding of the load cell holding members 44 is still required only now the welding is performed on the plate 64. The use of an expendable load cell or tacking and removing is still required and the usual problems associated with welding are still present (warping, fatigue cracks, etc.)

Description of the Preferred Embodiment of the Present Invention

Figure 11:
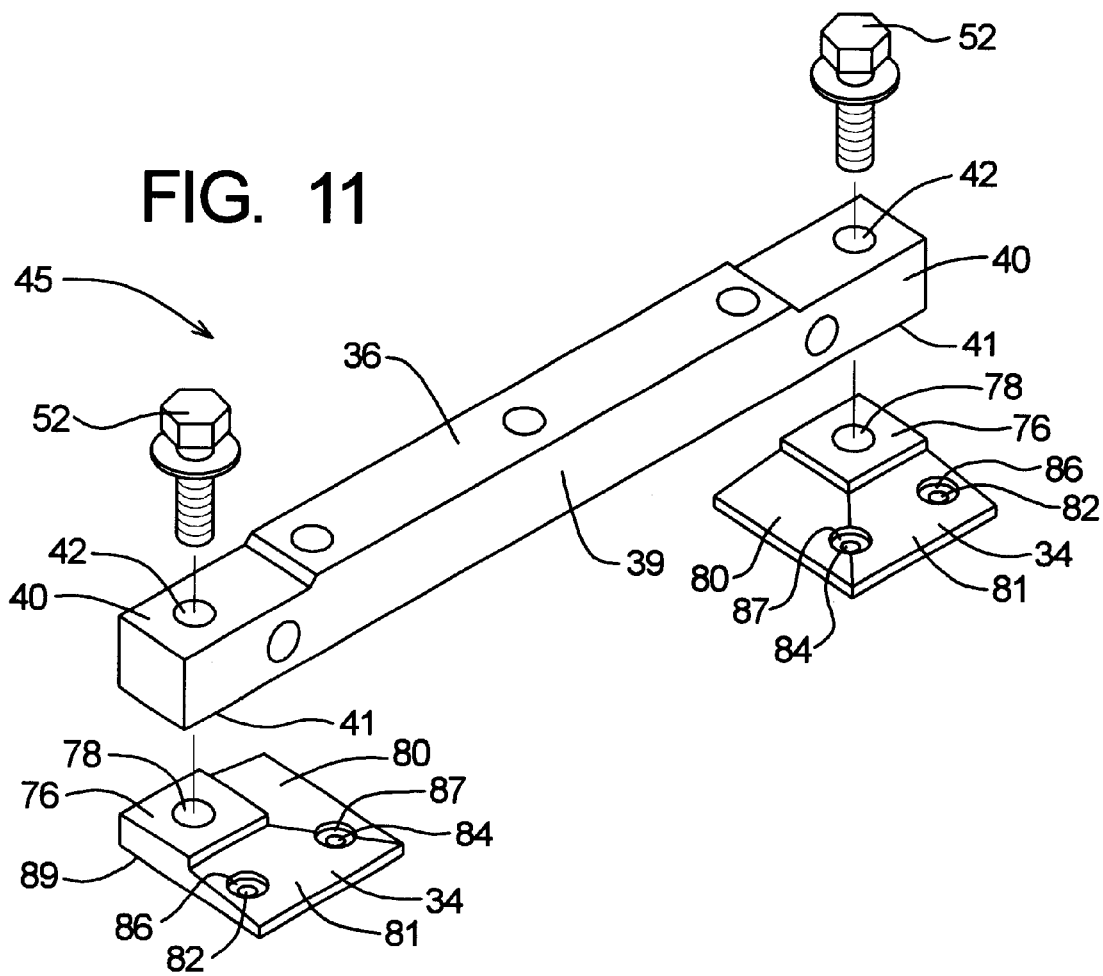
FIG. 11 is an exploded view of the load cell sub arrangement of the present invention comprising the load cell, the load cell holding members and the connecting bolts.

The present invention was already described briefly earlier in this text and a shown in figures two and three. The apparatus of the present invention will now be further described in more detail with reference to FIGS. 11–17. FIG. 11 shows an exploded view of a load cell sub arrangement 45 of the present invention; this arrangement comprising the load cell 36, load cell holding members 34 and two bolts 52. The load cell 36 and the bolts 52 are or may be the same as in the prior art but the holding members 34 differ from the prior art load cell holding members 44. Two load cell sub arrangements 45 and a lateral connecting member such as the bolster 29 or the fifth wheel 38 (see FIGS. 2 and 3) comprise a load cell arrangement 43.

As seen in FIGS. 15–17, the load cell holding member 34 comprise an upper contact surface 76, a tapped opening 78, holes 82 and 84, annular level stepped portions 86 and 87, an inner beveled portion 80 and lateral beveled portion 81. For purposes of analysis regarding the force distribution and stresses upon the load cell holding member 34, it can be considered as having a longitudinal vertical plane 73 and lateral vertical plane 75. Regarding the force distribution and stresses upon the load cell holding member 34, it is divided into four quadrants I–IV identified by numerals 92, 94, 96, 98. As seen in FIG. 16 quadrant I (shown as numeral 92) is in the upper left area of the load cell holding member 34 and is defined at a location to the left of lateral vertical plane 75 and above longitudinal vertical plane 73. Still referring to FIG. 16 and moving in a clockwise fashion, quadrant II (shown generally as numeral 94) is above the longitudinal vertical plane 73 and to the right of lateral vertical plane 75. Quadrant III (numeral 96) is located at the lower right hand portion of the load cell holding means 34 below longitudinal vertical plane 73 and to the right of lateral vertical plane 75. And finally quadrant IV is located in the bottom left area of the load cell holding means 34 as seen in FIG. 16 and is located below the longitudinal vertical plane 73 and to the left of lateral vertical plane 75.

The aforementioned contact surface 76 of the load cell holding means 34 is a flat surface positioned in a level contact plane. This contact surface 76 occupies the quadrant I (92), and it is adapted to engage a related end bottom surface portion 41 of a load cell 36. The inner edge 79 of the contact surface 76 lies in the lateral vertical plane 75 and is at the location where inner beveled portion 80 and contact portion 76 meet. The load cell holding members 34 each have a tapped opening 78 that is threaded to receive one of the related bolts 52. Located in quadrant IV (98) is the vertical hole 82 and located in quadrant III is the vertical hole 84. These holes 82 and 84 are of a sufficiently large diameter to allow the threaded portion of bolts 82 (shown in FIGS. 12–14) to freely pass. Surrounding each of these holes is an annular horizontal surface portion 86 and 87, respectively, which are perpendicular to the central axis of their holes 82 and 84. These surfaces 86 and 87 provide a level surface so that the heads of bolts 108 have a platform to engage in load bearing relationship.

Figure 12:
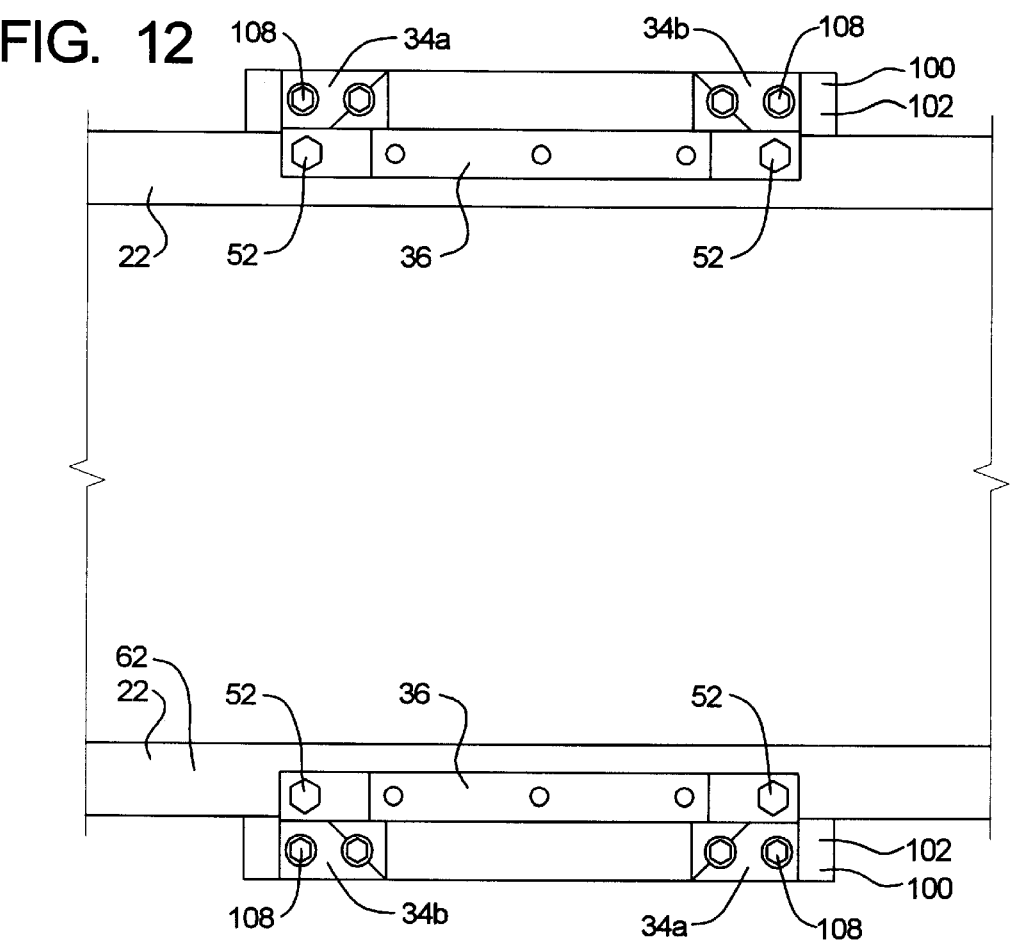
FIG. 12 is a top plan view of the load cell assembly of the present invention incorporating load cell units of FIG. 11.
Figure 13:
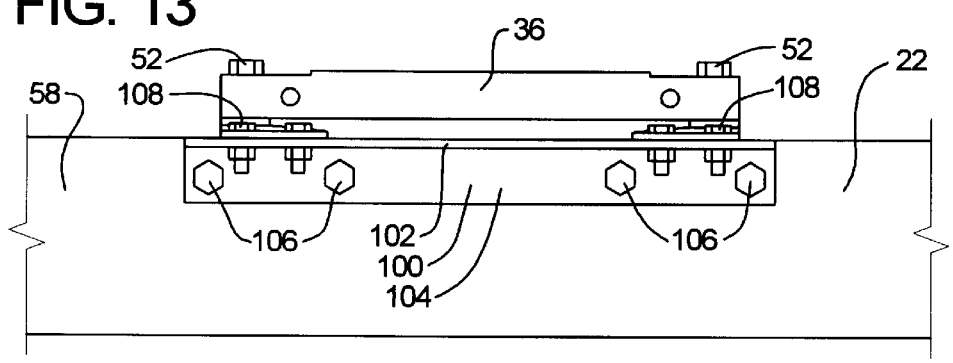
FIG. 13 is a side view of the load cell holding assembly of FIG. 12.
Figure 14:
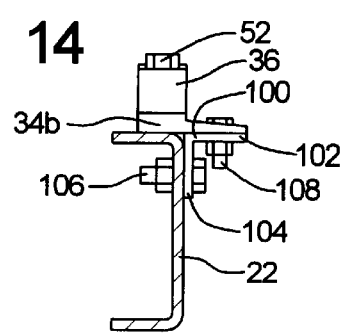
FIG. 14 is a front view of the load cell holding system.

As seen in FIGS. 12–14, there is a structural angle 100 that consists of an upper leg 102 and a lower leg 104. The lower leg 104 is bolted to the lateral vertical web 58 of C-channel members 22 with bolts 106. It is advantageous to bolt the lower leg 104 in a more vertically central location near the neutral axis of lateral vertical web 58 where the compressive and tensile stresses are lower in C-channel members 22.

The upper leg 102 of the structural angle 100 is positioned to be substantially level and in the plane occupied by the upper flange 62 of C-channel members 22. The upper leg 102 has a sufficient width (i.e. in the lateral direction) approximately the dimension of the quadrants III and IV in the lateral direction. Quadrants III and IV are positioned above the upper leg 102. The upper leg 102 has holes therein at locations that correspond to the location of the holes 82 and 84 of the load cell holding members 34. The bolts 108 extend through the holes 82 and 84 and through the holes in the upper leg 102 to secure each of the load cell holding members to the upper leg 102.

The structural angle 100 can have a greater length in the longitudinal direction to provide multiple hole sets 110 in the upper leg 102. The location of each set 110 corresponds to the location of holes 82 and 84 of the load cell holding members 34 when they are attached to a load cell 36. These hole sets 110 allow for the load cell arrangement 43 to be positioned in several longitudinal locations with respect to the C-channel members 22. If a truck and trailer arrangement does not have a desirable load distribution in the longitudinal direction of the frame in a truck, it is advantageous to be able to easily move the load cell arrangement 43.

As indicated above, quadrants I and II of the load cell holding members 34 are positioned above the upper flange 62 of C-channel members 22. The load cell 36 is bolted to the contact surfaces 76 of the load cell holding members 34 where the tapped openings 78 receive the bolts 51.

As seen in FIG. 3, for the present invention to be adapted for a fifth wheel arrangement there are a few dimensional adjustments. The standard in the trucking industry is to have the lateral width of a fifth wheel to be twenty-nine inches which is a slightly smaller lateral distance than the bolster 29 that is approximately thirty two inches. The lateral distance in quadrants III and IV can be increased approximately an inch and a half each to make the net lateral width of the load cell holding members 34 greater. The holes 82 and 84 are repositioned in a greater outwardly lateral direction. This has the effect of repositioning the contact surface 76 and the tapped opening 78 more laterally inwardly so that the load cells 36 are positioned more laterally inwardly so the more laterally narrow fifth wheel 38 can be attached thereon.

With reference to FIG. 2, when a load is placed on the load cells 36 by the bunk 29, the force is distributed to the longitudinal bottom end portions 40 of the load cells 36 and then to the contact surface 76 finally to be passed to the C-channel frame member 22. If the deflection in the load cell 36 is minimal and the forces are distributed substantially evenly across the contact surface 76 of the load cell holding member 34, then the force will be transmitted to the C-channel frame in a manner that the bolts 106 and 104 should have very little stress due to the load from the load cell 36.

If the modulus of elasticity of the load cell holding members 34 is sufficiently high and when a load cell 36 is subjected to a sufficient load that causes greater deflection in the load cell, a different stress distribution would occur. In this scenario the end bottom portion 41 of the load cell 36 will be urged upwardly to pivot on edge 79 of load cell holding member 34. This will cause bolt 52 to pull in an upward direction in the tapped opening 78 where the threads of the bolt are engaged in the hole. This action creates a moment about inner edge 79 which tends to lift quadrant I (92) of load cell 34 (see FIG. 18). The bolt 108 in vertical hole 82 holds quadrant IV down. Therefore this moment about inner edge 79 is counteracted by the sheering force along longitudinal vertical plane 73 in the vertical plane between quadrants I (92) and quadrants IV (98). The force that is exerted by the bolt 82 into the structural angle 102 and then into the C-channel 22. Further the aforementioned moment about inner edge 79 is counteracted by the tensile stresses in the lower juncture portion and compressive stresses in the upper juncture portion between quadrants I and II.

The final assembly process of the load cell holding assembly 24 is accomplished by inserting three sets of bolts for each sub-assembly. First the load cells may be bolted to a bolster or a bolster template. A bolster template can be a piece of metal that has the same dimensions of a regular bolster 29 except it can be lighter and have the bottom portion planed so it is as level as possible. Next the bolts 52 are inserted through vertical holes 42 of a load cell 36 into the tapped openings 78 of the load cell holding members 34. The load cell holding members are now used to align and mark holes that are drilled in the upper leg 102 for the corresponding location of holes 82 and 84 of the load cell holding members 34. The bolts 108 fasten the load cell holding members 34 to the upper leg 102 of the structural angle 100. Finally holes are marked and drilled in the lower leg 104 and vertical web 58 to allow the bolts 106 to fasten the lower leg 104 of the structural angle 100 to the C-channel members 22. As aforementioned, the structural angle 100 could be longer to allow multiple positions of the load cell holding arrangement 43. This repositioning could be done if multiple sets of holes are drilled in the upper leg 102 of the structural angle 100 so the location of these multiple sets of holes correspond to the location of holes 82 and 84 of the load cell holding members 34.

The drilling procedure could be refined to using a preset template to easily identify the exact location of the holes to be drilled and the final assembly of bolting the load cell holding assembly 24 can be done in any order.

The present invention completely removes welding from the installation of a load cell holding arrangement. This saves time and removes the problems associated with welding such as warping and fatigue cracks. Further, there is no need to use an expendable load cell while assembling the present invention or tacking and removing a functioning load cell while welding occurs. The present invention further removes the need for a plate 67 as shown in the prior art FIGS. 8–10 which adds extra weight and expense. A further advantage is ease of repositioning of the load cell arrangement to create a more desirable load distribution on the frame 23.

To explain the manner in which the various forces are transmitted to the load cell assembly and into the structure, reference is now made to FIGS. 18A through 18J. To keep the drawings FIGS. 18A through 18J the numerical designations of the components have not been added, and in those few instances where a numerical designation has been given to a particular component or part thereof, and in those few instances where a numerical designation has been given to a component or a part thereof, this will not correspond to a numerical designation given earlier in this text.

We begin by looking at FIG. 18A which shows the left part of the load cell, where there is a central load 110 exerted downwardly on the middle of the load cell (see 18A and 18C), and an upward force 112 is exerted against the lower surface of the left end portion of the load cell. Also, there is shown a downward force 114 which is applied by the head 116 of the bolt 118. The effect of these forces tends to stress the load cell so that it will distort slightly. This distortion is shown in a rather exaggerated form in FIG. 18A, mainly for purposes of illustration.

The shank of the bolt 118 is stressed in tension and this is illustrated by the force 120. The whole pulling force of the bolt 18 causes an upward force 122 (see FIGS. 18E and 18F) at the location of the threaded socket for the bolt 118.

It will be noted (see FIGS. 18E and 18F) that there is a large downward force 124 which is exerted by the load cell at the location where the force 112 is exerted on the lower end surface portion of the load cell (see FIGS. 18A and 18C). This force 124 is along the entire lateral edge at that location, and this is transmitted downwardly through the structure of the holding member to be transmitted at 126 to the upper surface of the upper web of the C-beam (see FIG. 18J). Thus, can be seen that the load whose weight is being measured is transmitted by the force 110 (FIG. 18A and 18C) through the load cell at the (location 112) through the forced 124 to the C-beam at 126.

Figure 18D:
Figure 18F:
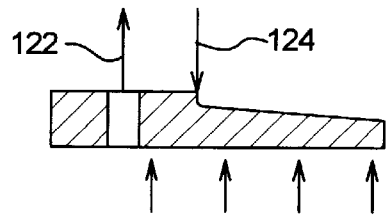

It will be noted by observing the force diagrams in FIG. 18F that the two forces 122 and 124 (these being rather large forces) create a force couple tending to pull the laterally inward raised quarter segment of the holding member upwardly. This upward force is resisted by the stiffness of the holding member. More specifically, with reference to FIG. 18F, it can be seen that the forces exerted at 127 against the bottom right surface portion counteracts the force at 122, this force 127 resulting from contact with the C-beam at the location where the downward forces 126 are exerted (see FIG. 18J). Beyond that, the upward force 122 on the holding member is laterally outward reacted into the second portion of the holding member which is positioned immediately above the upper horizontal flange of the right angle member. More specifically, with reference to FIG. 18E, there is a force exerted at 128 by the bolt that extends through that bolt opening to hold the outside corner of the holding member down. At the other outside corner to the left of the location of the force component 128, the holding member receives an upward force exerted by its location of contact at the upper surface of the upper flange of the right angle.

Figure 18E:
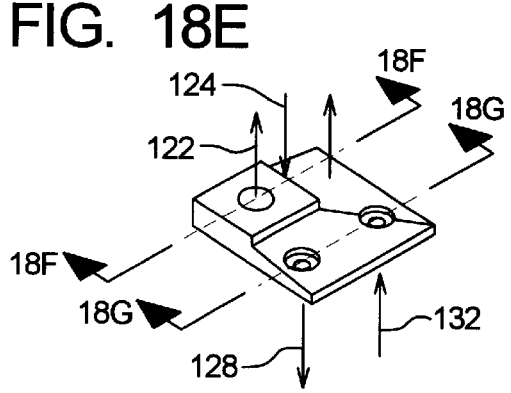
Figure 18G:
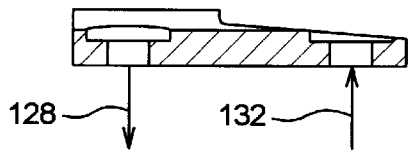
Figure 18H:
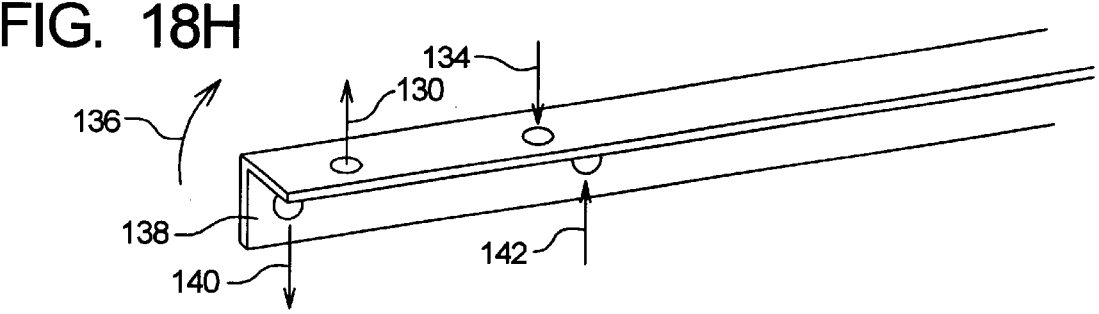

With reference to FIGS. 18E and 18H, it can be seen that the two forces 128 and 132 are reactive at the first locations 130 and 134 in FIG. 18H. Thus, there is exerted a force moment indicated by the arrow 136 to rotate the left side of the angle connecting member upwardly. However, this moment is resisted first by the stiffness of the vertical flange 138 of the right angle member. With the flange 138 being vertically aligned, this flange 138 is highly resistant to any bending in the direction of the moment 138.

The forces 130 and 134 transmitted into the right angle connecting member are reacted at the locations of the bolts extending through openings of the vertical flange 138, and the forces exerted by the two retaining bolts are indicated by the downward force exerted at the left hand part of the right angle member at 140 and the upward force exerted at 144 in the vertical flange 138 of the right angle member.

These forces of the bolts exerted at 140 and 142 (see FIG. 18H) are in turn reacted into the vertical web of the C-beam at 144 and 146.

Figure 18J:
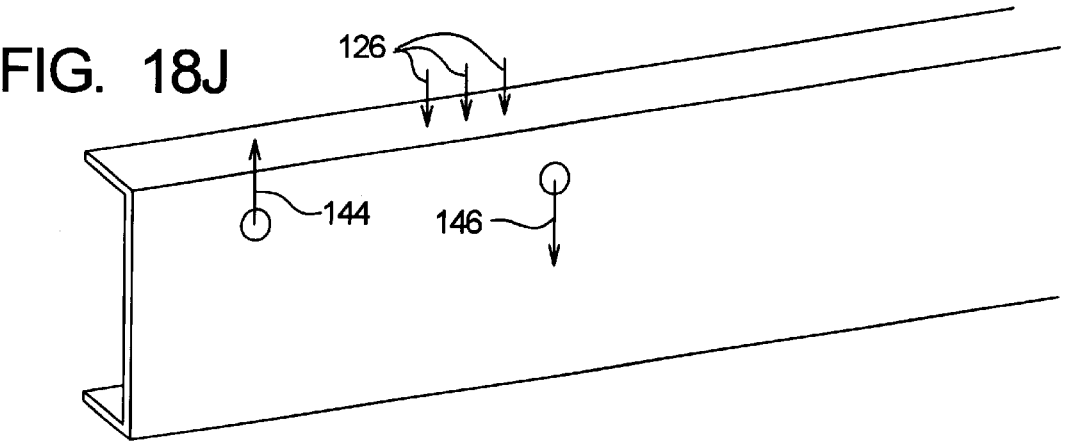

To summarize the manner in which the forces are transmitted in the present invention, first there is the task of the load cell assembly supporting the load which rests upon the load cell. As indicated previously, the load from the load cell is transmitted at 110 and thence into a downward force which is exerted at 124 (FIG. 18E and FIG. 18F) into the holding member. The holding member in turn transmits the loads at 124 downwardly into the holding member at 128 (FIG. 18J).

Then, there is some more complex pattern of forces relating to the forces exerted to maintain the load cell in the proper orientation. There are at least two main force paths. First, with reference to FIG. 18F, there is a force couple from the forces 122 and 124 which would tend to lose the outer end of the load cell to an upward slant. This is resisted by the bolt 118 securing the outer end portion of the load cell to the holding member, and the stiffness of the holding member resisting the movement of the end of the load cell. This is illustrated in FIG. 18F. Beyond that, the holding member transmits these forces laterally outwardly into the second holding member portion which is in turn connected by bolts to the upper flange of the connecting member. A tendency for upper rotational movement of the left side of the holding member is resisted in the right angle member, and the loads imposed on the right angle member are in turn transmitted into the web of the C-beam.

In summary, it can be seen that the load cell assembly does not require any welding or other bonding operation. Rather, the only specially made component is the holding member, and the existing C-beam is utilized. The right angle connecting member can be made from standard stock. The connectors are mechanical connectors and in the preferred form these are simply nut and bolt connections. It is understood however within the broader scope of the present invention, that while the preferred form of connectors are shown, other mechanical connectors could be used if desired. However, the nuts and bolts connection allow these to be easily assembled, and also disassembled for replacement, repair and possible relocating of the load cell, etc.

While the invention is susceptible of various modifications and alternative forms, specific embodiments thereof have been shown by way of example in the drawings as described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. It is desired that the embodiments described above may be considered in all respects as illustrative, not restrictive, reference being made to the appended claims to indicate the scope of the invention.

I claim:

1. A load cell connecting assembly adapted to be mounted to a base support structure and to transmit a force or forces from a load transmitting portion of a load support structure to the base support structure in a manner to enable the load cell assembly to ascertain force or forces applied from said load supporting structure and through the load cell assembly in order to determine a load carried by said load support structure, where said base support structure comprises a horizontal base support portion having an upper support surface with first and second base contact surface portions, a lateral edge, and an adjacent generally vertically aligned base wall portion with an adjacent side surface portion extending downwardly from the lateral edge, said load cell assembly comprising:

a) a load cell having a lengthwise axis, first and second end portions having first and second downwardly facing end contact surface portions, and a force receiving portion to receive said force or forces from said load transmitting portion;

b) a load cell holding section comprising first and second holding members, each of which is capable of being attached mechanically to its related end portion of said load cell, each holding member comprising:

i. first holding portion which has an upwardly facing bearing surface portion and which, with the holding member in an operating position, is connected to its related load cell end portion so that the upwardly facing bearing surface portion is in bearing engagement with the contact surface portion of its related load cell end portion, said first holding portion having a downwardly facing bearing surface portion which is in operative load bearing engagement with its related base contact surface portion of the base support structure;

ii. a second holding portion which is fixedly connected to said first holding portion and which has a downwardly facing interconnecting surface and which, with the holding member in the operating position, extends outwardly from the first holding portion and from an adjacent side surface portion of the base support structure;

c) an interconnecting section having a first generally horizontal attaching portion that is in an operating position positioned below and mechanically attached to the second holding portions of the two holding members and having a second generally vertical attaching portion positioned adjacent to and mechanically attached to the generally vertically aligned base support portion of the base support structure;

whereby at least a portion of the force and forces which are exerted through said load cell member and to the holding members are in turn transmitted into the interconnecting section and into the base support structure.

2. The load cell assembly as recited in claim 1, wherein said first and second attaching portions comprise a structural member comprising first and second elongate plate-like portions connecting along an adjacent edge at an angle, with said first plate-like portion extending generally horizontally from the upper support surface of said base support structure and being mechanically attached to said second holding portions of the two holding members, and said second plate-like member being adjacent to and mechanically attaching to an adjacent side wall of said base support structure.

3. The load cell assembly as recited in claims 2, wherein said first plate-like member of the interconnecting section is generally horizontally aligned with the upper surface of the base support member.

4. A method of installing a load cell assembly to a base support structure, wherein said base support structure has an upwardly facing load-bearing surface portion;

a) providing a load cell having a lengthwise axis with first and second end portions, each of which has a downwardly facing end contact surface portion, and a force-receiving portion to receive a force or forces from a load transmitting portion of a load-supporting structure;

b) providing first and second holding members, each of said holding members comprising a first load cell connecting portion and a second structure connecting portion, each of said load cell connecting portions having an upwardly facing bearing surface adapted to come into contact with and bearing engagement with a related one of the contact surface portions of the load cell;

c) positioning each of the holding members adjacent to the related end portions of the load cell so that the bearing surfaces of the first holding portions are in operative engagement with the contact surface portions of the load cell and mechanically attaching the holding members to the load cell, so that the first holding portion is positioned beneath its related load cell end portion, and the second holding portion extends laterally therefrom and laterally from said base support structure;

d) providing an interconnecting section having a first attaching portion and a second attaching portion, positioning said interconnecting section so that the first attaching portion is located adjacent to the second connecting portions of the holding members and mechanically connecting the first attaching portion to the second holding portions of the holding members;

e) positioning the load cell, the holding members, and the interconnecting section adjacent to the base support structure so that the second attaching portion of the interconnecting section is positioned adjacent to the base support structure, and mechanically interconnecting the second attaching portion to the base structure to fixedly position the load cell so that downwardly facing load surfaces of the first holding portions of the holding members are in operative bearing engagement with the base support structure and a load bearing structural assembly is made from the load cell end portions through the holding members to the interconnecting section and to the base support frame, whereby, bearing loads imposed on force-receiving portion of the load cell are transmitted from the load cell end portions through the holding members to the base structure, and bending and/or torsional forces imposed by the load cell to the holding members is reacted from the second holding portions of the holding members into the attaching section and into the base support structure.

5. A load cell holding device for connecting a load cell to a base support structure and to transmit a force or forces from a load transmitting portion of a load support structure to the base support structure in a manner to enable the load cell assembly to ascertain force or forces applied from said load supporting structure and through the load cell assembly in order to determine a load carried by said load supporting structure, where said base support structure comprises a horizontal base support portion having an upper support surface with first and second base contact surface portions and an adjacent generally vertically aligned base support portion with an adjacent side surface portion, and said load cell has a lengthwise axis, first and second end portions having first and second downwardly facing end contact surfaces, and a force receiving portion to receive said force or forces from said load transmitting portion, said load cell connecting device comprising:

a) a first holding portion which has upwardly facing bearing surface portion and an upwardly facing connecting recess to receive a connector, and which, with the connecting device in an operating position, is connected to a related load cell end portion so that the upwardly facing bearing surface portion is in bearing engagement with the end contact surface of its related load cell end portion, said first holding portion having a downwardly facing bearing surface portion adapted to be in operative load bearing engagement with its related base contact surface portion of the base support structure;

b) a second holding portion which is fixedly connected to, and extending laterally from, said first holding portion, and which has a downwardly facing interconnecting surface and which, with the holding device in the operating position, extends outwardly from the adjacent side surface portion of the base support structure;

c) said second holding portion having at least one through opening to receive a connector to connect the second holding portion to an interconnecting section having a first generally horizontal attaching portion that can be positioned below and attached to the second holding portion of the connecting device and has a second generally vertical attaching portion that can be positioned adjacent to and mechanically attached to the generally vertically aligned base support portion of the base support structure;

whereby, with two of the holding devices in the operating position, at least a portion of the force and forces which are exerted through said load cell member and through the two connecting devices to be transmitted into the interconnecting section and into the base support structure.

* * * * *